US012768743B2

(12) United States Patent
Kasahara et al.

(10) Patent No.: US 12,768,743 B2
(45) Date of Patent: Oct. 20, 2026

(54) MATERIAL FLEXURE MEASURING DEVICE, SYSTEM, METHOD, AND PROGRAM

(71) Applicant: NTT, Inc., Tokyo (JP)

(72) Inventors: Hisatoshi Kasahara, Tokyo (JP); Yosuke Takeuchi, Tokyo (JP); Junichiro Tamamatsu, Tokyo (JP); Yosuke Okamura, Tokyo (JP)

(73) Assignee: NTT, Inc., Tokyo (JP)

( * ) Notice: Subject to any disclaimer, the term of this patent is extended or adjusted under 35 U.S.C. 154(b) by 358 days.

(21) Appl. No.: 18/567,339

(22) PCT Filed: Jun. 7, 2021

(86) PCT No.: PCT/JP2021/021643

§ 371 (c)(1),
(2) Date: Dec. 5, 2023

(87) PCT Pub. No.: WO2022/259340

PCT Pub. Date: Dec. 15, 2022

(65) Prior Publication Data

US 2024/0272036 A1 Aug. 15, 2024

(51) Int. Cl.
*G01M 5/00* (2006.01)

(52) U.S. Cl.
CPC .................................. *G01M 5/0041* (2013.01)

(58) Field of Classification Search
CPC .................................................... G01M 5/0041
See application file for complete search history.

(56) References Cited

U.S. PATENT DOCUMENTS 3,178,936 A * 4/1965 Finsterwalder .......... G01N 3/20
73/854
2025/0050534 A1* 2/2025 Hakeem .................. B28B 1/008

FOREIGN PATENT DOCUMENTS

| | | | | |
|---|---|---|---|---|
| CN | 110220803 A | * | 9/2019 | G01N 3/20 |
| CN | 111307614 A | * | 6/2020 | G01N 3/24 |
| DE | 102020206345 A1 | * | 11/2020 | G01N 3/20 |
| JP | 2023006809 A | * | 1/2023 | |
| KR | 20200035561 A | * | 4/2020 | G01N 3/18 |
| MY | 201427 A | * | 2/2024 | G01N 3/068 |
| WO | WO-02099390 A1 | * | 12/2002 | G01N 3/20 |
| WO | WO-2018170998 A1 | * | 9/2018 | G01G 3/14 |

OTHER PUBLICATIONS

Japan Resinconcrete Products Association "Resin concrete manhole for sewerage JSWAS K-10" literature [online] accessed on Apr. 19, 2021, website: http://www.jrpa.gr.jp/seihin/manhool.html.
Sunrec Co., Ltd (2016) "What is resin concrete?" literature [online] accessed on Apr. 19, 2021, website: http://www.sunrec.co.jp/about#concrete/.

(Continued)

*Primary Examiner* — Andre J Allen

(57) ABSTRACT

There is provided a measurement device (1020) including: a height difference acquisition unit (131) that acquires a height difference between two points on a bottom surface of a structure; and a material flexural strength calculation unit (141) that calculates material flexural strength of the structure based on the height difference.

20 Claims, 18 Drawing Sheets

(56) References Cited

OTHER PUBLICATIONS

Miwa et al. (2020) “Strength Reduction Mechanism and Strength Estimation of Unsaturated Polyester Resin Concrete Deteriorated in Outdoor Soil” Zairyo-to-Kankyo, vol. 69, No. 6, pp. 161-168.
NTT Access Network Service Systems Laboratories “Non-destructive inspection technology for resin concrete manholes” TsuKuBa year history [online] accessed on Mar. 24, 2021, website: https://www.rd.ntt/as/history/infra/in0221.html.
Department of Structural Engineering, Faculty of Engineering, Nagasaki University “Introduction to Structural Engineering (Mechanics of Deformation)” literature [online] accessed on Apr. 27, 2021, website: http://www.st.nagasaki-u.ac.jp/ken/matsuda/lecture/kozo-nyumon/2003/ohp.pdf.
Atsushi Mukai (1973) “Resin concrete and resin mortar and their properties” Concrete Journal, Japan Concrete Institute, vol. 11, No. 4.

* cited by examiner

MATERIAL FLEXURE MEASURING DEVICE, SYSTEM, METHOD, AND PROGRAM

CROSS-REFERENCE TO RELATED APPLICATIONS

This application is a U.S. 371 Application of International Patent Application No. PCT/JP2021/021643, filed on 7 Jun. 2021, the disclosure of which are hereby incorporated herein by reference in its entirety.

TECHNICAL FIELD

The present disclosure relates to a measurement device, a measurement system, a measurement method, and a program capable of estimating strength from deformation of a structure.

BACKGROUND ART

Structures are required to have designs that can sufficiently withstand loading in use environments based on the strength of materials to be used. Accordingly, it is assumed that characteristics of the materials to be used are sufficiently ascertained in the design. However, strength of materials of structures to be used for a long period of time may be changed due to deterioration or the like. Since deterioration in strength of materials of structures directly results in deterioration in proof stress of the structures, responsible owners of the structures are required to appropriately ascertain the deterioration in the material strength.

For example, resin concrete (hereinafter referred to as "REC") is a material widely used for structures and the like. There are 100,000 or more communication manholes (hereinafter referred to as "RECMHs") of NTT manufactured of REC all over the country. REC is also a material of a sewer manhole (see Non Patent Literature 1).

Many studies for the material characteristics of REC have been carried out so far, and the strength (flexural strength, compressive strength, tensile strength, shear strength, and the like) thereof is 3 to 5 times that of cement concrete (see Non Patent Literature 2). On the other hand, unclear points regarding changes in material characteristics due to aging of REC over time have been considerable for many years. However, in recent year, there has been a report that strength deteriorates over time (see Non Patent Literature 3).

Methods of examining the material strength of structures vary depending on materials, but most directly, there is a method of taking out a part of a structure as a sample and performing a compression test, a tensile test, and the like.

There is a non-destructive inspection technique in which ultrasonic measurement is utilized for strength measurement of RECMH (see Non Patent Literature 4).

CITATION LIST

Non Patent Literature

Non Patent Literature 1: Japanese Resinconcrete Products Association, "Sewer Manholes," [online], [retrieved on Apr. 19, 2021], Internet <URL: http://www.jrpa.gr.jp/seihin/manhool.html>

Non Patent Literature 2: SUNREC Co., Ltd., "What is resin concrete?", [online], [retrieved on Apr. 19, 2021], Internet <URL: http://www.sunrec.co.jp/about #concrete/>

Non Patent Literature 3: Takashi Miwa, Kazue Takahashi, Hiroyuki Takahashi, Takashi Sawada, "Strength Reduction Mechanism and Strength Estimation of Unsaturated Polyester Resin Concrete Deteriorated in Outdoor Soil," Materials and Environment, 2020 Vol. 69, No. 6, p. 161-167

Non Patent Literature 4: NTT Access Service Systems Laboratories, "Resin concrete manhole non-destructive inspection technique," [online], [retrieved on Mar. 24, 2021], Internet <URL: https://www.ansl.ntt.co.jp/history/infra/in0221.html>

SUMMARY OF INVENTION

Technical Problem

The above-described destructive test is often not preferred in that it generally takes time and incurs costs, and that it may not be allowed to damage a structure from the viewpoint of safety or the like in the first place. For RECMH, it is not realistic to perform a destructive test on 100,000 RECMHs across the country.

Although a non-destructive inspection is superior to a destructive inspection in terms of cost, there are problems that a dedicated device is required, preprocessing for an ultrasonic measurement surface is required, and it takes time for measurement.

An object of the present disclosure is to provide a measurement device, a measurement system, a measurement method, and a program capable of estimating a material flexural strength of a structure simply through simple length measurement.

Solution to Problem

According to an embodiment, a measurement device includes: a height difference acquisition unit configured to acquire a height difference which is a difference in vertical displacement between two points on a bottom surface of a structure; and a material flexural strength calculation unit configured to calculate a material flexural strength of the structure based on the height difference.

According to another embodiment, a measurement system includes: the foregoing measurement device; and measurement equipment. The measurement equipment includes a horizontal member, a first vertical member that is fixed to the horizontal member to be able to move in a vertical direction with respect to the horizontal member and includes a displacement presentation unit indicating first displacement in the vertical direction; and a second vertical member that is fixed at a position different from the first vertical member on the horizontal member to be able to move in a vertical direction with respect to the horizontal member, and includes a displacement presentation unit indicating second displacement in the vertical direction. The measurement device acquires a height difference based on the first displacement and the second displacement.

According to still another embodiment, a measurement method includes: a height difference acquisition step of acquiring a height difference which is a difference in vertical displacement between two points on a bottom surface of a structure; and a material flexural strength acquisition step of obtaining a material flexural strength of the structure based on the height difference information.

According to still another embodiment, a program causes a computer to function as the measurement device.

Advantageous Effects of Invention

According to the present disclosure, it is possible to provide a measurement device, a measurement system, and a measurement method capable of estimating a material flexural strength only through simple length measurement when a structure is loaded.

DESCRIPTION OF EMBODIMENTS

As described above, there are proposed a measurement device, a measurement system, and a measurement method capable of estimating material strength only through simple length measurement by utilizing characteristics that the degree of deformation differs depending on material flexural strength when a structure is loaded. A deformation behavior of a structure at the time of loading of the structure differs depending on a loading position, a size, material strength, a structure shape, and the like. These are stored as a database and can be ascertained at the time of inspection. Examples of a target structure include a resin concrete manhole made of resin concrete of which strength changes over time. In the present embodiment, the technology will be described by exemplifying a case where the structure is an RECMH.

Figure 1A:
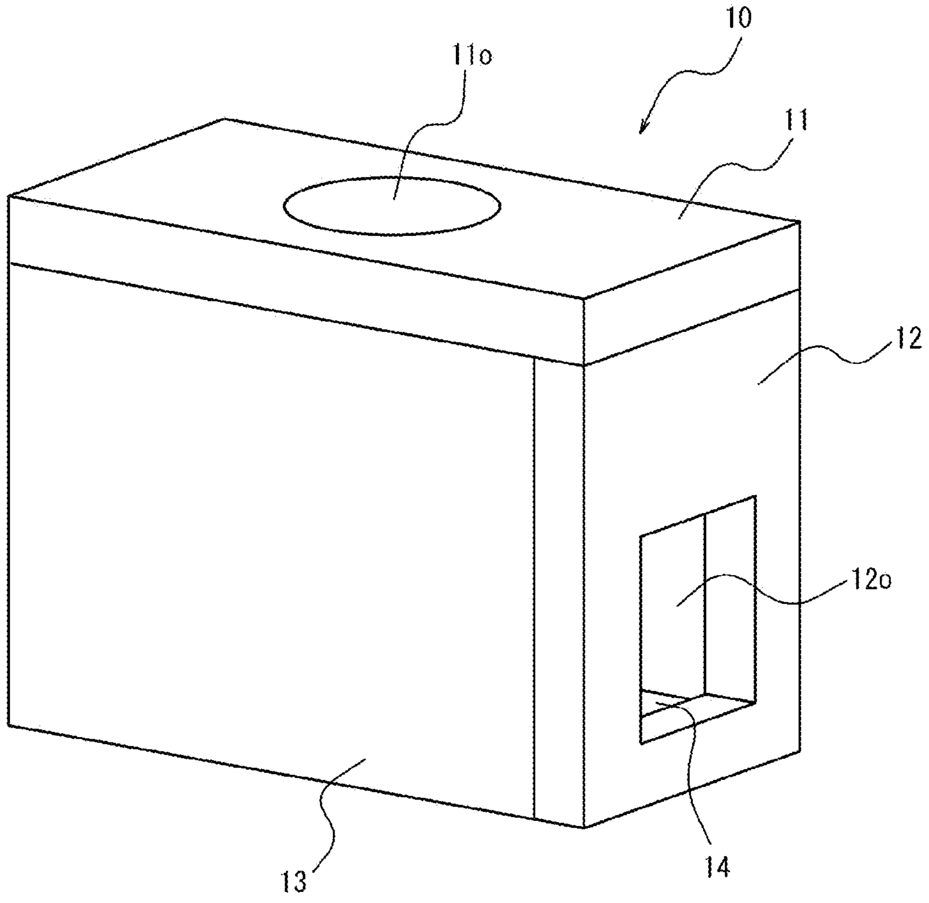
FIG. 1A is a perspective view of an RECMH for which a measurement device according to an embodiment estimates material strength.
Figure 1B:
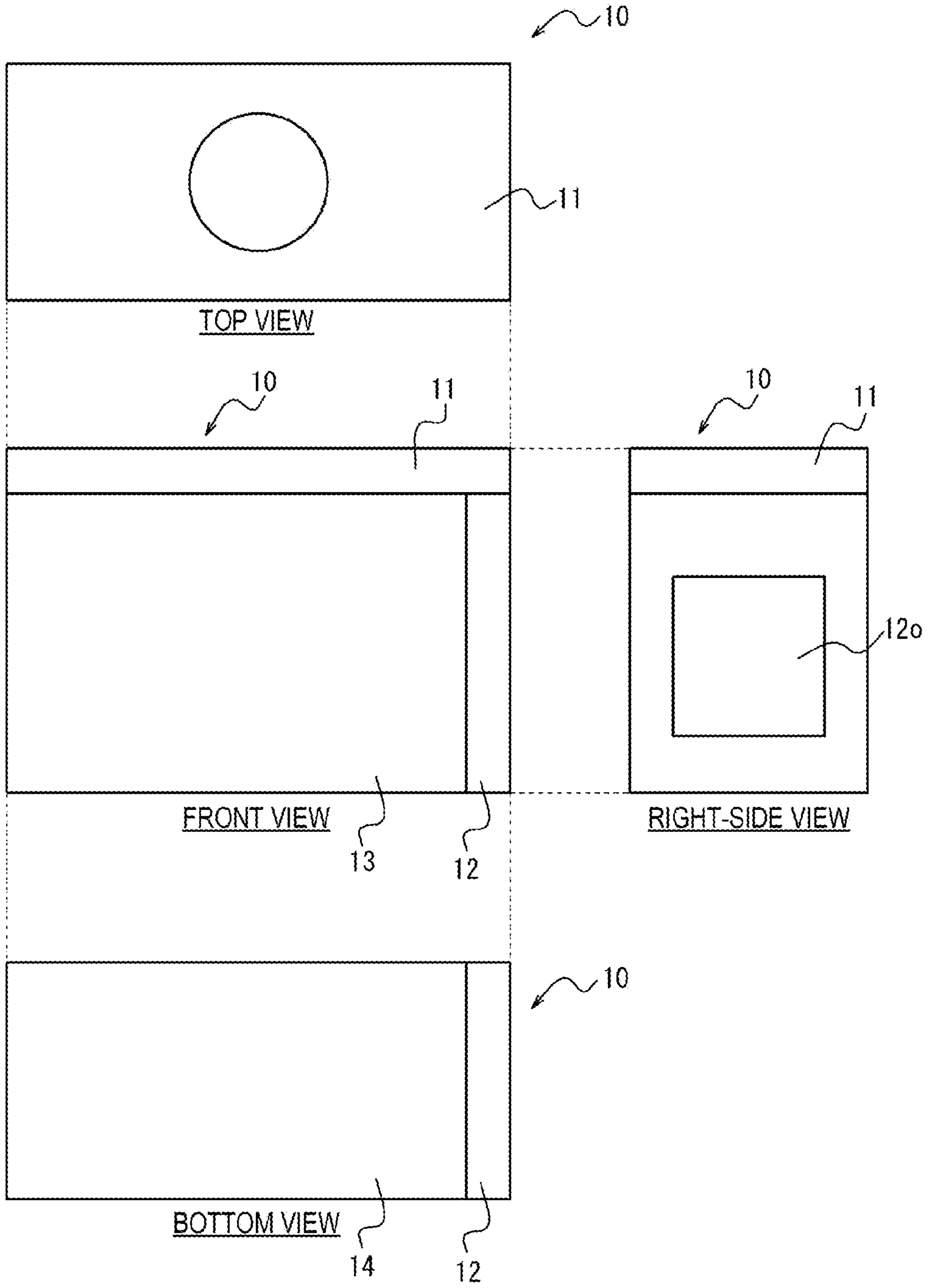
FIG. 1B is a top view, a front view, a right-side view, and a bottom view of the RECMH illustrated in FIG. 1A.

FIGS. 1A and 1B illustrate a structure of an RECMH 10. The RECMH 10 has a hollow rectangular parallelepiped shape and includes an upper floor slab 11, two short side walls 12, two long side walls 13, and a lower floor slab 14. Typically, the upper floor slab 11 and the lower floor slab 14 of the RECMH 10 are installed parallel to a horizontal plane, but the present invention can be applied even if at least one of them is inclined with respect to the horizontal plane. In the following example, it is assumed that the upper floor slab 11 and the lower floor slab 14 are installed parallel to the horizontal plane.

The upper floor slab 11 has a circular opening 11*o*, and each short side wall 12 has a rectangular opening 12*o*. The number of openings or the shapes of the openings provided in the RECMH 10 can be changed.

The RECMH 10 is an underground structure, and the load applied to the RECMH 10 after installation includes a soil pressure applied at all times and a vehicle load applied when a vehicle or the like passes thereover. Since the vehicle does not travel on the RECMH 10 during inspection of the RECMH 10, deformation only by an earth pressure may be considered.

A vertical soil pressure on the RECMH 10 is caused by soil on the upper floor slab 11. Strictly speaking, the horizontal earth pressure should also be considered, but it is considered that an influence of the horizontal earth pressure on the deformation of the RECMH 10 can be ignored. Here, the description of the horizontal earth pressure will be omitted.

According to the tunnel standard specifications (refer to "Tunnel Standard Instruction (edited by the Japan Society of Engineers of Japan)", 1986, the upper part of p. 22.), a unit volume weight of backfilled soil (a groundwater level or less) is 2.0 $t/m^3$=19.6 $kN/m^3$. A depth from the ground surface to the upper floor slab 11 of the RECMH 10, that is, a soil thickness, is generally 0.5 m. In this case, the vertical soil pressure to the RECMH 10 is 19.6×0.5=9.8 $kN/m^2$.

In order to examine a deformation behavior when a load corresponding to the vertical earth pressure was applied to the RECMH 10, a test RECMH 10' equivalent to the RECMH 10 was prepared and a loading test was performed. Since the test RECMH 10' has the same constituents as the RECMH 10, the constituents of the test RECMH 10' are denoted by the same reference numerals as the RECMH 10.

The test RECMH 10' used at this time has a known material flexural strength (hereinafter simply referred to as "flexural strength" in this document) of REC according to JIS A 1181: 2005, which is 6.5 MPa.

Although there are several sets of dimensions for the RECMH, an RECMH with a length of 3000×a width of 1400×a height of 1700 mm of which there are a large number, was used for the test RECMH 10'.

Figure 2:
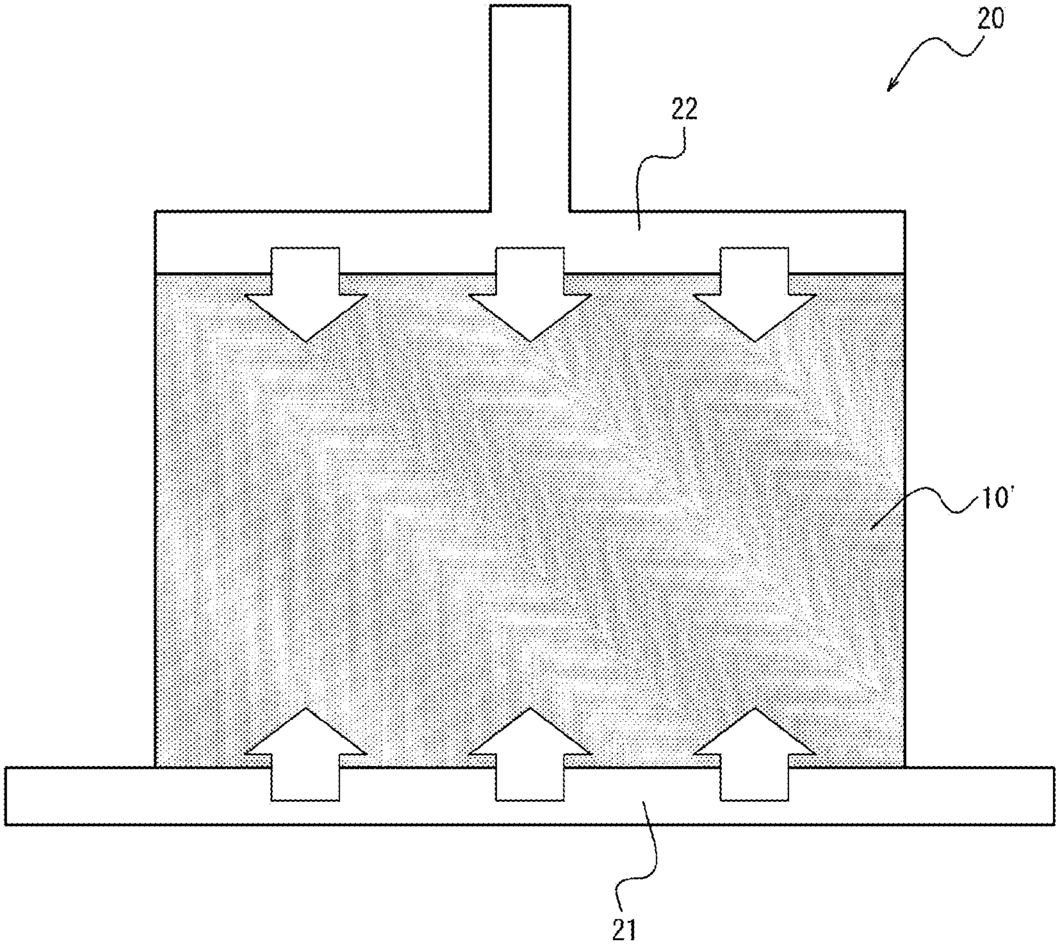
FIG. 2 is a diagram illustrating a state of loading on the RECMH in a loading test.

In the loading test, loading was performed, as illustrated in FIG. 2. That is, a monotonic uniaxial compression loading test was performed using a 10 MN structure tester 20.

Figure 3:
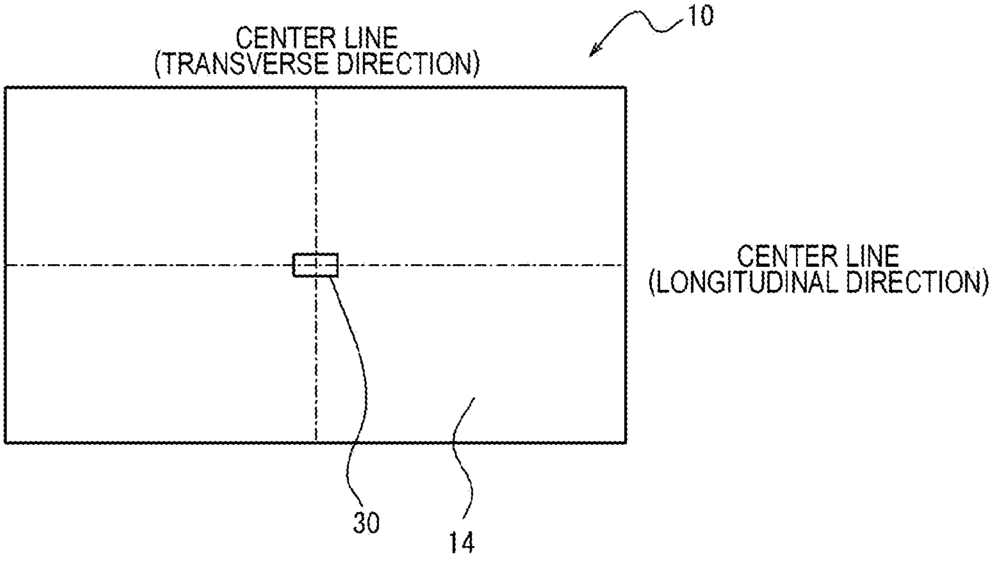
FIG. 3 is a diagram illustrating a lower floor slab of a test RECMH and a strain gauge attached to the lower floor slab.

In order to examine the deformation behavior of the test RECMH 10', a strain gauge 30 was attached along the longitudinal direction of the lower floor slab 14 at a position illustrated in FIG. 3, that is, at the center of the upper surface of the lower floor slab 14 of the test RECMH 10'.

In the 10 MN structure tester 20 illustrated in FIG. 2, a test specimen (the test RECMH 10') is installed on a steel floor 21, and a load is applied vertically downward by a loading plate 22 covering the entire upper surface of the test specimen. As a result, the test specimen is loaded by a uniform load indicated by downward arrows from the loading plate 22 and a reaction force indicated by upward arrows of the steel floor 21. The loading speed was 0.01 mm/sec.

Figure 4A:
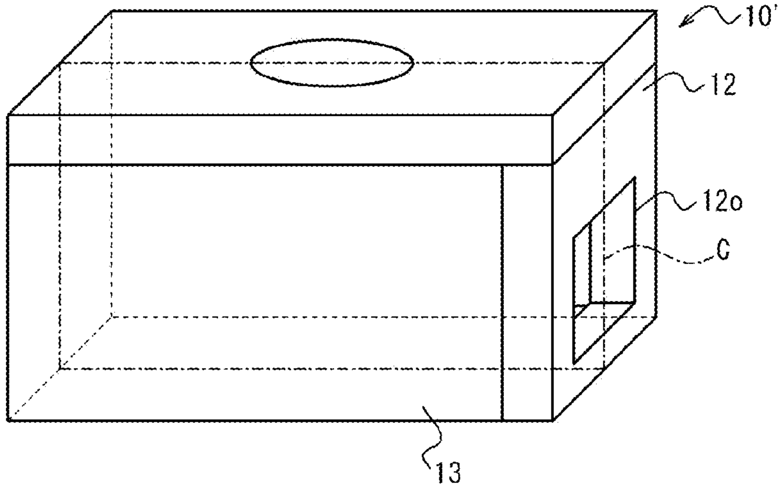
FIG. 4A is a perspective view illustrating a test RECMH.
Figure 4B:
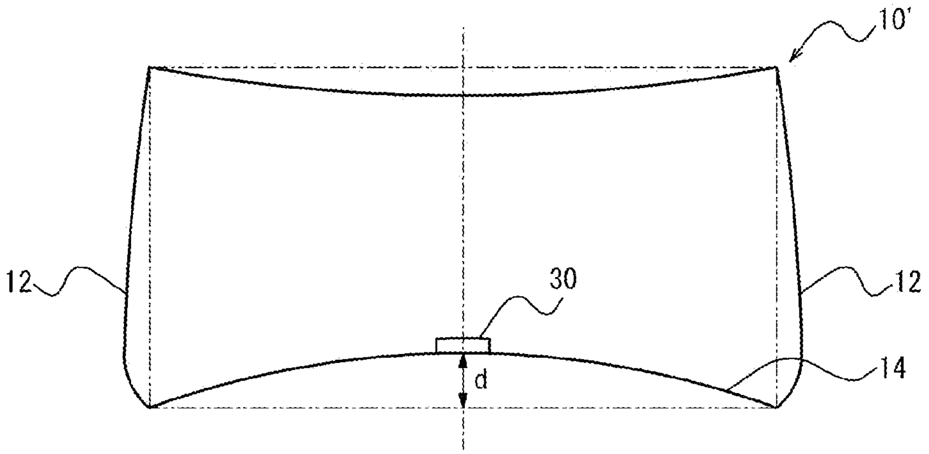
FIG. 4B is a cross-sectional view taken along a cut plane C of FIG. 4A and illustrating a sketch of a deformation behavior.

FIG. 4A is a perspective view illustrating the test RECMH 10'. FIG. 4B is a cross-sectional view taken along a cut plane C in the longitudinal direction through the center of the test RECMH 10' and illustrates a sketch of a deformation behavior. In FIG. 4B, a two-dot chain line indicates the shape of the test RECMH 10' before deformation, and a solid line indicates the shape of the test RECMH 10' after deformation. In FIG. 4B, there is an opening 12*o* in the short side wall 12, but a portion of the opening 12*o* is illustrated complementarily. The lower floor slab 14 to which the strain gauge 30 was attached was deformed to bulge inward.

It is considered that the deformation illustrated in FIG. 4B is caused by a reaction force against a load applied downward in the vertical direction from the loading plate 22 illustrated in FIG. 2. In this loading test, a horizontal earth pressure is not taken into consideration. However, it is considered that the horizontal earth pressure has a small influence on the deformation of the lower floor slab 14.

When measurement on a site is considered, as illustrated by the sketch in FIG. 4B, it is preferable to use a displacement difference d between at least one end portion and a central portion in the longitudinal direction of the lower floor slab 14 as an index of the degree of deformation of the structure from the viewpoint of compatibility of both simplicity and accuracy of the measurement. Accordingly, when such an experiment is carried out, it is basically sufficient to measure the vertical displacement difference d between one end portion and the central portion.

In the embodiment, the deformation of the end portion of the cut plane C taken in the longitudinal direction through the center of the test RECMH 10' is examined, but an extension direction between the end portion and the center may be changed. For example, referring to FIG. 3, it is possible to examine deformation on a plane taken in the transverse direction through the center of the test RECMH 10'. It is also possible to determine the extension direction between the end portion and the center so that the measurement is not hindered by a wiring or the like which is in the test RECMH 10'.

As a method other than the method directly measuring the displacement difference d between the end portion and the central portion, as described above, there is a method of deriving the displacement difference between the end portion and the central portion from the displacement (strain) in the horizontal direction by calculation. Hereinafter, an example of the method will be described. First, for example, at the center of the lower floor slab 14, an elongation along the center line extending in the longitudinal direction is calculated from the strain in the longitudinal direction of the lower floor slab 14. Thereafter, the displacement difference d between the end portion and the central portion can be calculated by calculating the vertical displacement at the central portion of the center line of the lower floor slab 14 from the elongation along the center line of the lower floor slab 14. A specific example will be described below.

When an end portion of the lower floor slab 14 in a direction other than the longitudinal direction is examined, strain of the lower floor slab 14 corresponding to this direction is measured.

Figure 5:
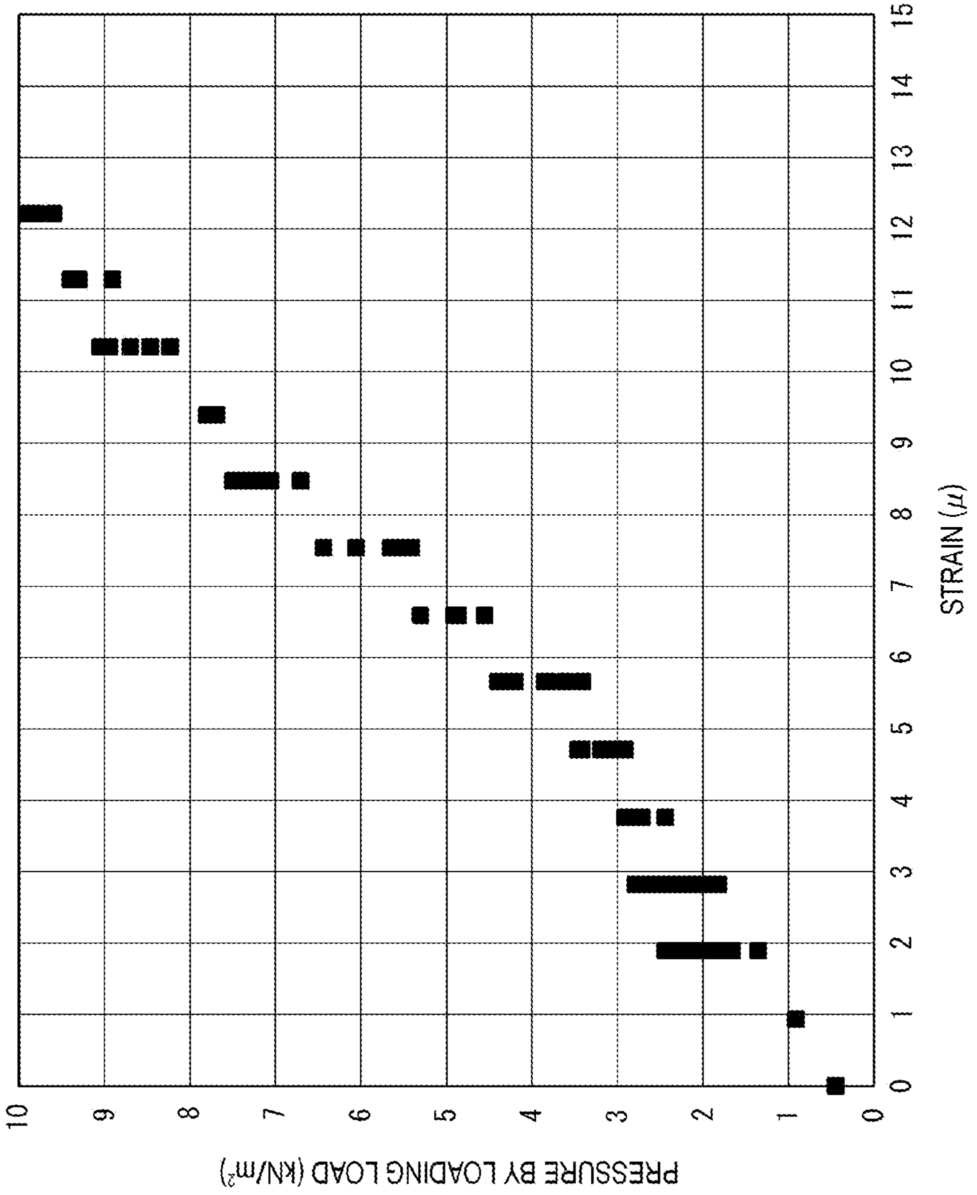
FIG. 5 is a diagram illustrating a relationship between pressure received by an upper floor slab of a test RECMH and strain measured by a strain gauge.

FIG. 5 illustrates a relationship between a pressure received by the upper floor slab 11 of the test RECMH 10' by the loading plate 22 of the 10 MN structure tester 20 illustrated in FIG. 2 and the strain measured by the strain gauge attached to the upper surface of the lower floor slab 14 as illustrated in FIG. 4B. The strain gauge is disposed on the center axis of the lower floor slab 14 in the longitudinal direction. When a pressure of 9.8 N/m$^2$ corresponding to the vertical soil pressure was loaded on the upper floor slab 11 of the test RECMH 10', the strain was $12\times10^{-6}$.

Figure 6:
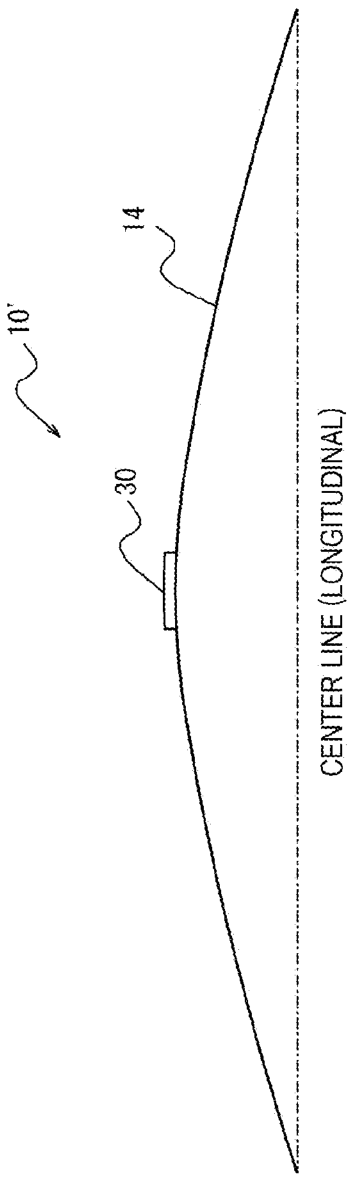
FIG. 6 is a diagram illustrating deformation of an upper surface of the lower floor slab.

The displacement of the central portion in the vertical direction when the strain of the lower floor slab 14 in the horizontal direction is $12\times10^{-6}$ is considered. The strain measured here is a maximum at the center of the lower floor slab 14 on the center line (indicated by a two-dot chain line) in the longitudinal direction of the lower floor slab 14 as illustrated in FIG. 6. Conversely, the strain decreases toward the end portion, and the strain becomes 0 at the end portion. The elongation due to the deformation of the center line is considered in consideration of a strain value continuously changing on the center line of the lower floor slab 14.

A minute section on the center line in the longitudinal direction of the lower floor slab 14 is defined as $\Delta x$. The elongation in this section is defined as $\Delta Lx$. The maximum value of $\Delta Lx/\Delta x$ is $12\times10^{-6}$, and the minimum value is 0. Since the deformation of the center line (length L=3000 mm) before the deformation is bilaterally symmetrical, the deformation of the half section $L_{1/2}$ (here, 1500 mm) is considered. At this time, this half section can be divided into $L_{1/2}/\Delta x$ pieces. Of sections obtained by dividing the half section into $L_{1/2}/\Delta x$, a section with a maximum strain ($12\times10^{-6}$) is a section closest to the center, and the section with a minimum strain (0) is a section closest to the end.

In such a case, it is difficult to calculate all $\Delta Lx$ corresponding to the minute section $\Delta x$. Therefore, as the most general case, assuming that the strain value decreases from the maximum value $\Delta Lx_{max}$ equally for $L_{1/2}/\Delta x$ times and finally becomes the minimum value 0, the elongation $\Delta L_{1/2}$ at the half section length $L_{1/2}$ can be expressed as follows. According to the foregoing assumption, the elongation on the center line of the lower floor slab 14 can be calculated as an accurate approximate solution to some extent.

[Math. 1]

$$\Delta L_{1/2} = \Delta Lx_{max}\times\Delta x\times\frac{\frac{L_{1/2}}{\Delta x}}{\frac{L_{1/2}}{\Delta x}} + \Delta Lx_{max}\times\Delta x\times\frac{\frac{L_{1/2}}{\Delta x}-1}{\frac{L_{1/2}}{\Delta x}} + \Delta Lx_{max}\times\Delta x\times\frac{\frac{L_{1/2}}{\Delta x}-2}{\frac{L_{1/2}}{\Delta x}} + \ldots\ \Delta Lx_{max}\times\Delta x\times\frac{\frac{L_{1/2}}{\Delta x}-\frac{L_{1/2}}{\Delta x}}{\frac{L_{1/2}}{\Delta x}}$$

Here, it is necessary to appropriately set $\Delta x$ so that $L_{1/2}/\Delta x$ takes an integer value. The foregoing expression is a sum of an arithmetic progression and is expressed as follows with n as an integer.

[Math. 2]

$$\Delta L_{1/2} = \Delta Lx_{max}\times\Delta x\times\sum_{n=0}^{\frac{L_{1/2}}{\Delta x}}\frac{\frac{L_{1/2}}{\Delta x}-n}{\frac{L_{1/2}}{\Delta x}}$$

Since $\Delta L_{1/2}$ is an elongation of the half section, the elongation $\Delta L$ of the entire section is obtained by doubling $\Delta L$.

[Math. 3]

$$\Delta L = \Delta Lx_{max}\times\Delta x\times 2\sum_{n=0}^{\frac{L_{1/2}}{\Delta x}}\frac{\frac{L_{1/2}}{\Delta x}-n}{\frac{L_{1/2}}{\Delta x}}$$

By solving the above expression, the elongation at the time of the deformation of the RECMH can be estimated.

In this test, when $L_{1/2}$=1500 mm, $\Delta Lx_{max}=12\times10^{-6}$, and $\Delta x$=1 mm, the following first expression is obtained, and the expression is further developed.

$$\Delta L = 12\times10^{-6}\times2\sum_{n=0}^{1500}\frac{1500-n}{1500} \quad \text{[Math. 4]}$$

$$\Delta L = 12\times10^{-6}\times2\left(\sum_{n=1}^{1500}\frac{1500-n}{1500}+1\right)$$

$$\Delta L = 12\times10^{-6}\times2\left(1500-\frac{1}{2}(1500+1)+1\right)$$

$$\Delta L = 0.018012$$

Accordingly, the length of the upper surface along the center line after the deformation is about 3000.018 mm.

Figure 7:
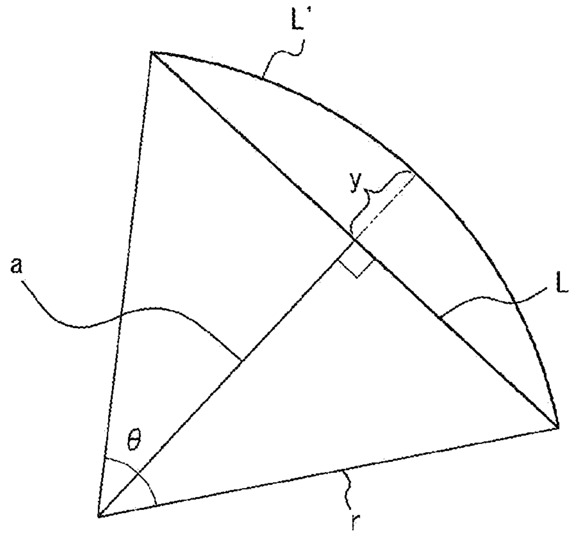
FIG. 7 is a diagram when deformation of the upper surface of the lower floor slab is assumed to be an arc.

In the fields of material mechanics, deformation due to beam bending is approximately calculated as an arc (see, for example, the following Reference Literature 1). In particular, when the angle θ of the arc is minute, it is more approximate. Therefore, as illustrated in FIG. 7, it is assumed that the upper surface (a length L') of the axial center line of the lower floor slab 14 deformed in the vertical direction is an arc with a radius r and an angle θ.

[Reference Literature 1] Department of Structural Engineering, Faculty of Engineering, Nagasaki University, "Introduction to Structural Engineering," [online], [retrieved on Apr. 27, 2021], Internet <URL: http://www.st.nagasaki-u.ac.jp/ken/matsuda/lecture/kozo-nyumon/2003/ohp.pdf>

Then, the arc length of the arc is expressed as follows.

$$r\theta = L' \quad \text{[Math. 5]}$$

The following expression is established from the definition of the triangular ratio with respect to a right triangle.

$$\frac{L}{2r} = \sin\frac{\theta}{2} \quad \text{[Math. 6]}$$

In this condition, L'=3000.018 and L=3000 are satisfied. Therefore, when these are substituted and the above two expressions (Math. 5 and Math. 6) are solved as simultaneous equations, θ≈0.012 (rad) and $r\approx2.50\times10^5$ (mm) are obtained. 0 is minute, and it can be said that the foregoing approximation of the arc is appropriate. At this time, a maximum displacement amount y in the vertical direction is expressed by the following expression. Here, a is a length of a perpendicular drawn from the center of the arc to the axial center line before the deformation.

$$y = r - a = r - \sqrt{r^2-\left(\frac{L}{2}\right)^2} \quad \text{[Math. 7]}$$

Therefore, y≈4.5 is obtained. Accordingly, on the surface of the lower floor slab 14 in the test RECMH 10', the maximum vertical displacement at the center line is 4.5 mm, and the difference from the end (displacement 0 mm) is 4.5 mm.

As described above, the test RECMH 10' used this time has a known flexural strength which is 6.5 MPa. Accordingly, for an RECMH in an environment where only soil pressure is applied in the vertical direction, when the difference in the vertical direction between the central portion and the end portion on the center line of the lower floor slab 14 in the longitudinal direction is 4.5 mm, the material flexural strength of the RECMH can be estimated to be 6.5 MPa.

In this way, the material strength can be estimated by obtaining the relationship between the material strength and the vertical displacement from the result of the loading test or a result of the simulation by a finite element method or the like and measuring the vertical displacement on a site.

Figure 8:
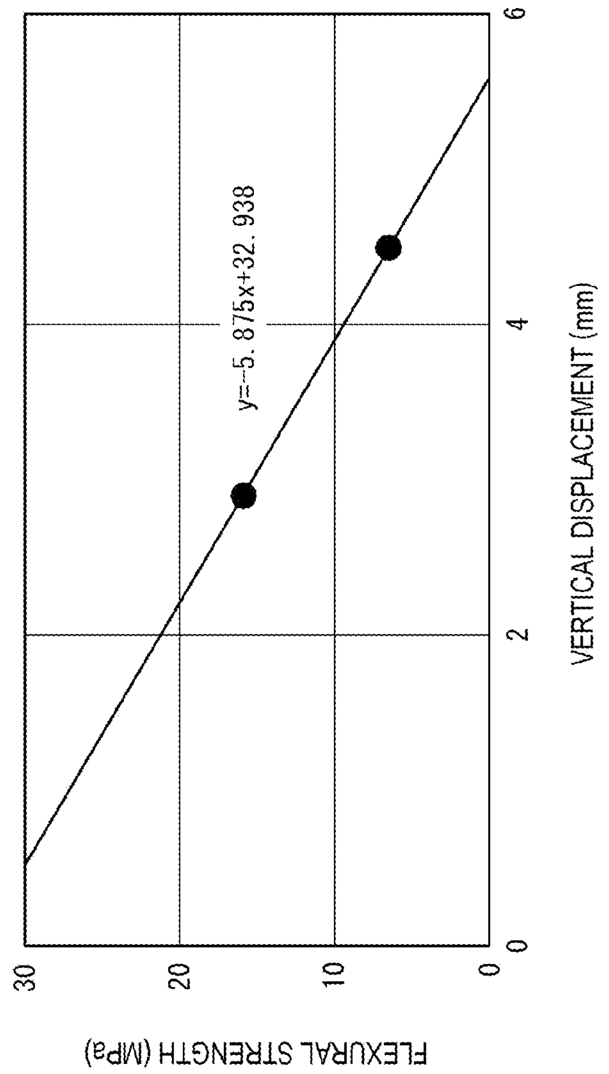
FIG. 8 is a diagram illustrating a relationship between vertical displacement on a surface of a lower floor slab and flexural strength of a test RECMH.

When the relationship between the material strength and the vertical displacement is acquired under a plurality of conditions, an approximate line indicating correlation between the material strength and the displacement can be obtained, and the material strength in a wider range can be estimated. For example, for the RECMH, a loading test was carried out for an RECMH that has a flexural strength of 15.9 MPa in accordance with the same method as the above-described method. As a result, the strain at the time of loading of the pressure of 9.8 N/m$^2$ corresponding to the vertical earth pressure on the upper floor slab 11 of the test RECMH 10' was $5\times10^{-6}$. At this time, on the surface of the lower floor slab 14 in the test RECMH 10', the vertical displacement at the center line was 2.9 mm. Therefore, as illustrated in FIG. 8, two points of (flexural strength MPa, vertical displacement: mm)=(6.5, 4.5), (15.9, 2.9) are plotted.

Next, an approximate line (flexural strength)=−5.875×(vertical displacement)+32.938, which is a straight line connecting these two points, can be derived. The reason for the linear approximation is that a stress-strain relationship at the time of applying of stress to the test RECMH 10' is a linear relationship in the minute strain region as this time (see, for example, the following Reference Literature 2).

Figure 10:
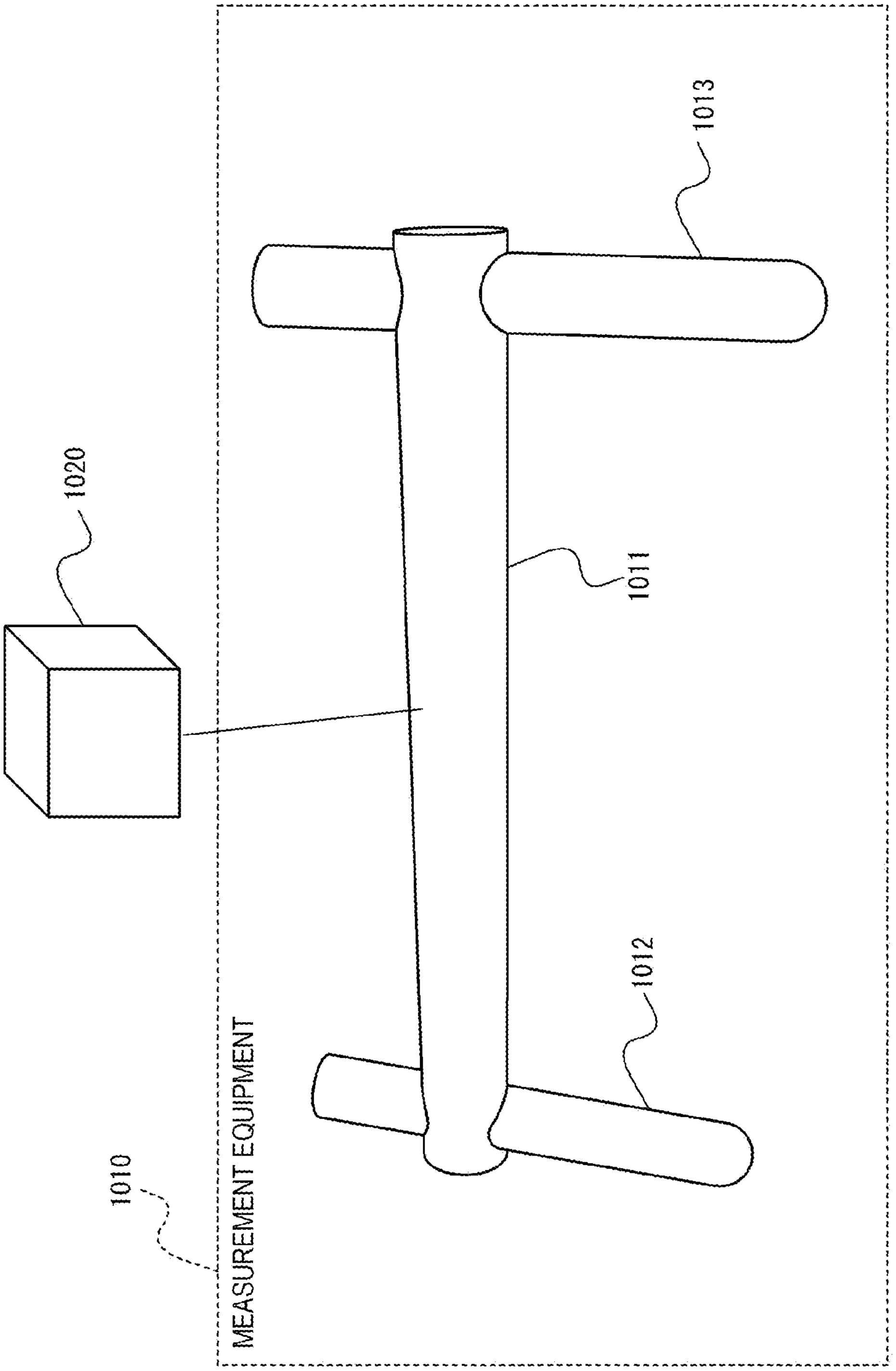
FIG. 10 is a bird's eye view illustrating a measurement system according to an embodiment.

[Reference Literature 2] Takeshi Mukai, "Resin Concrete and Resin Mortar, and Their Properties," Concrete Journal, the Japan Concrete Institute, Public Interest Incorporated Association, 1973, Vol. 11, No. 4, p. 15 (FIG. 10)

It is possible to draw a better approximation by increasing the number of conditions and obtaining more plots. In order to obtain an approximate expression, for example, a least squares method can be used. For example, when strength is estimated with another material or the like, the approximate expression may indicate a curve.

Figure 9:
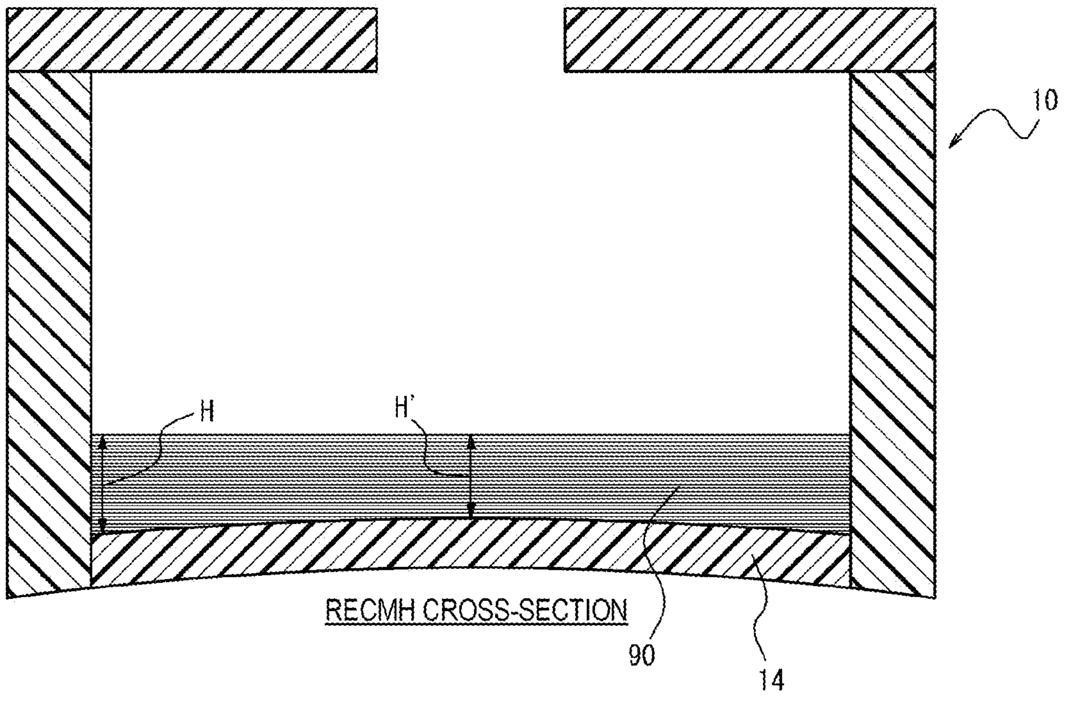
FIG. 9 is a diagram illustrating RECMH and retained water present therein.

When the displacement of the actual RECMH in the vertical direction is measured, it is easy to perform measurement by using retained water 90 which is in many RECMHs 10 as in FIG. 9. The water surface of the retained water 90 is horizontal, and a central portion height H' and an end portion height H of the retained water 90 can be easily measured using a ruler or the like. A displacement difference between a central portion and an end portion of a body (the RECMH 10) can be calculated by calculating the difference between the central portion height H' and the end portion height H. The strength of the RECMH 10 can be estimated from this displacement difference.

(Measurement System)

Figure 11:
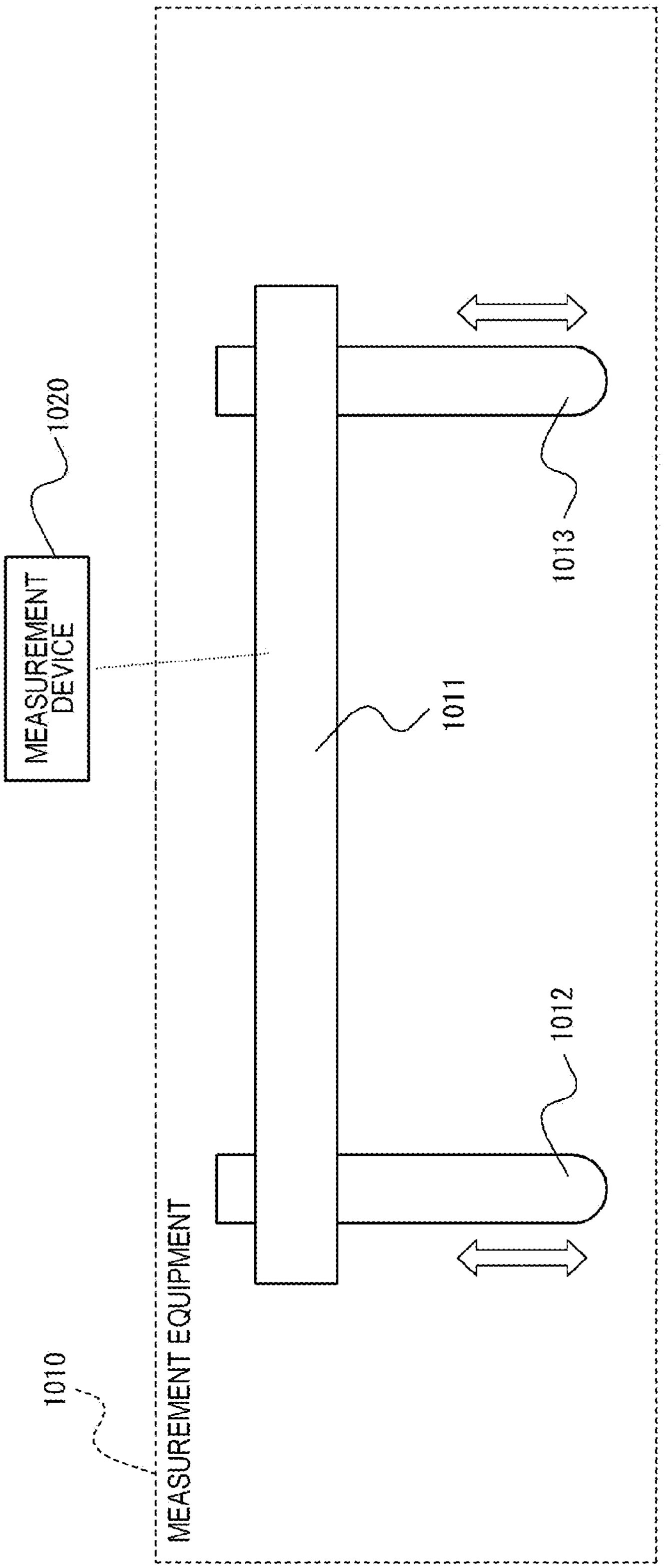
FIG. 11 is a side view illustrating the measurement system of FIG. 10.

Next, a measurement system that measures strength of a structure using the results of the loading test or the simulation will be described below. A bird's eye view of the measurement system is illustrated in FIG. 10 and a side view of the measurement system as viewed in the horizontal direction is illustrated in FIG. 11. As illustrated in the drawings, the measurement system includes measurement equipment 1010 and a measurement device 1020.

The measurement equipment 1010 includes a horizontal member 1011, a first vertical member 1012, and a second vertical member 1013.

It is desirable that the horizontal member 1011 can be stretched in an axial direction. It is desirable that the horizontal member is not displaced in a radial direction. The horizontal member 1011 may be fixed by a screw or the like in a state in which the horizontal member 1011 is stretched in the axial direction.

Preferably, the first vertical member 1012 and the second vertical member 1013 have the same shape and are rigid. In this embodiment, the first vertical member 1012 and the second vertical member 1013 are cylindrical. The first vertical member 1012 and the second vertical member 1013 are not completely bonded to the horizontal member 1011, but are fixed to the horizontal member 1011 to be able to be moved only in a direction perpendicular to the axial line of the horizontal member 1011. This configuration can be implemented, for example, by providing slight gaps between the horizontal member 1011, and the first vertical member 1012 and the second vertical member 1013. Movable ranges of the first vertical member 1012 and the second vertical member 1013 with respect to the horizontal member 1011 may be limited by providing unevenness in any member.

Figure 12:
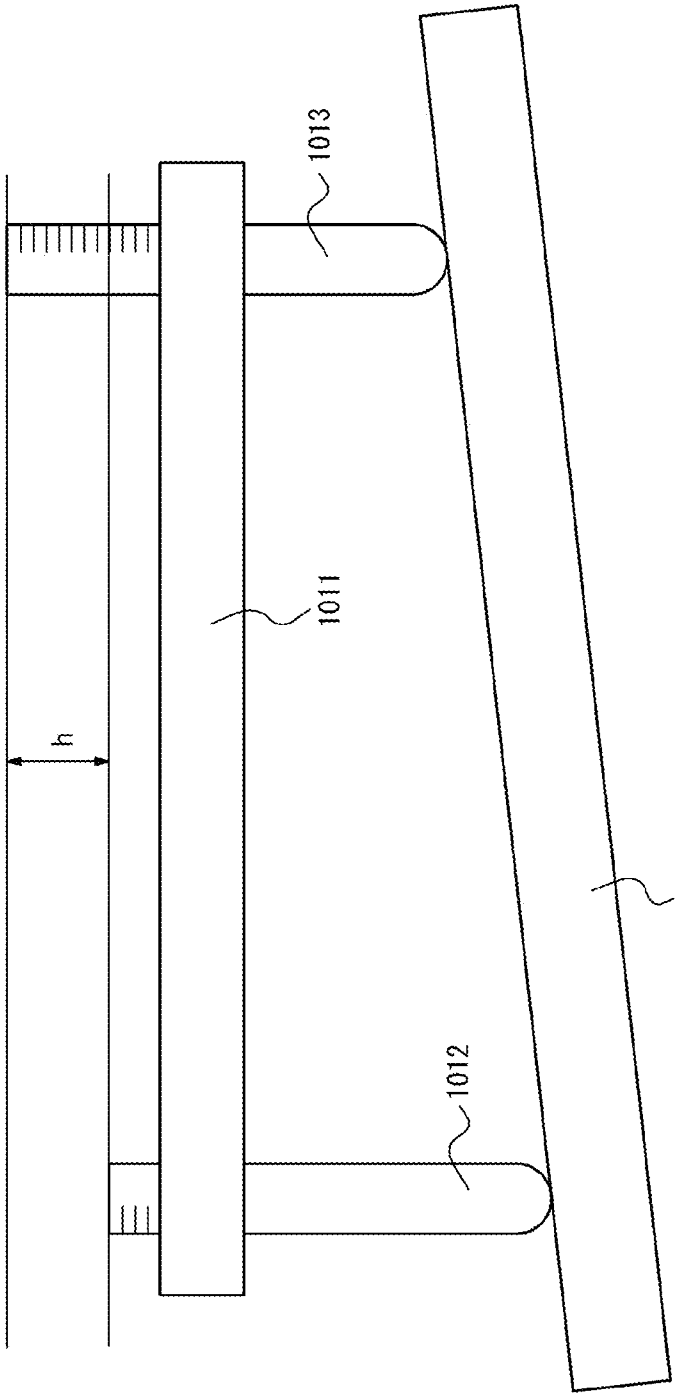
FIG. 12 is a diagram illustrating a state in which measurement equipment acquires a height difference of the bottom surface of a structure.

As illustrated in FIG. 12, for example, by measuring first and second protrusion amounts while keeping the horizontal member 1011 horizontal, it is possible to ascertain a height difference h of the grounding point. The measurement equipment 1010 may include a level so that the horizontal member 1011 can be oriented horizontally. The first and second protrusion amounts mentioned herein may refer not only to amounts by which the first vertical member 1012 and the second vertical member 1013 protrude from the surface of the horizontal member 1011 but also to amounts by which the first vertical member 1012 and the second vertical member 1013 are retracted.

The surface of the RECMH 10 has fine unevenness and a ground point is not necessarily horizontal. Therefore, the radius of the cross section of the first vertical member 1012 and the second vertical member 1013 is preferably 1 cm or more, and a grounding portion of the first vertical member 1012 and the second vertical member 1013 is preferably hemispherical.

When the height difference of the lower floor slab 14 of the RECMH 10 is measured, the first vertical member 1012 is grounded to an end portion of the lower floor slab 14 in the longitudinal direction, and the second vertical member 1013 is grounded to the central portion (or vice versa), and thus a displacement difference (height difference) between the end portion and the central portion can be measured simply and with high accuracy.

Displacement sensors serving as displacement presentation units may be provided in the first vertical member 1012 and the second vertical member 1013, and signals corresponding to the protrusion amounts of the first vertical member 1012 and the second vertical member 1013 in the vertical direction may be output to a height difference acquisition unit 131 of the measurement device 1020.

In another embodiment, instead of the measurement equipment 1010 automatically measuring the protrusion amount, circumferential surfaces of the first vertical member 1012 and the second vertical member 1013 can be used as rulers, and scales indicating the protrusion amounts in the vertical direction can be provided. The scale can also be printed on the circumferential surface. The scale may be formed of unevenness on the circumferential surface. In this case, a user can input a confirmed protrusion amount to the height difference acquisition unit 131 of the measurement device 1020. Hereinafter, the protrusion amount of the first vertical member 1012 in the vertical direction is referred to as a first protrusion amount, and the protrusion amount of the second vertical member 1013 in the vertical direction is referred to as a second protrusion amount.

(Measurement Device)

Figure 13:
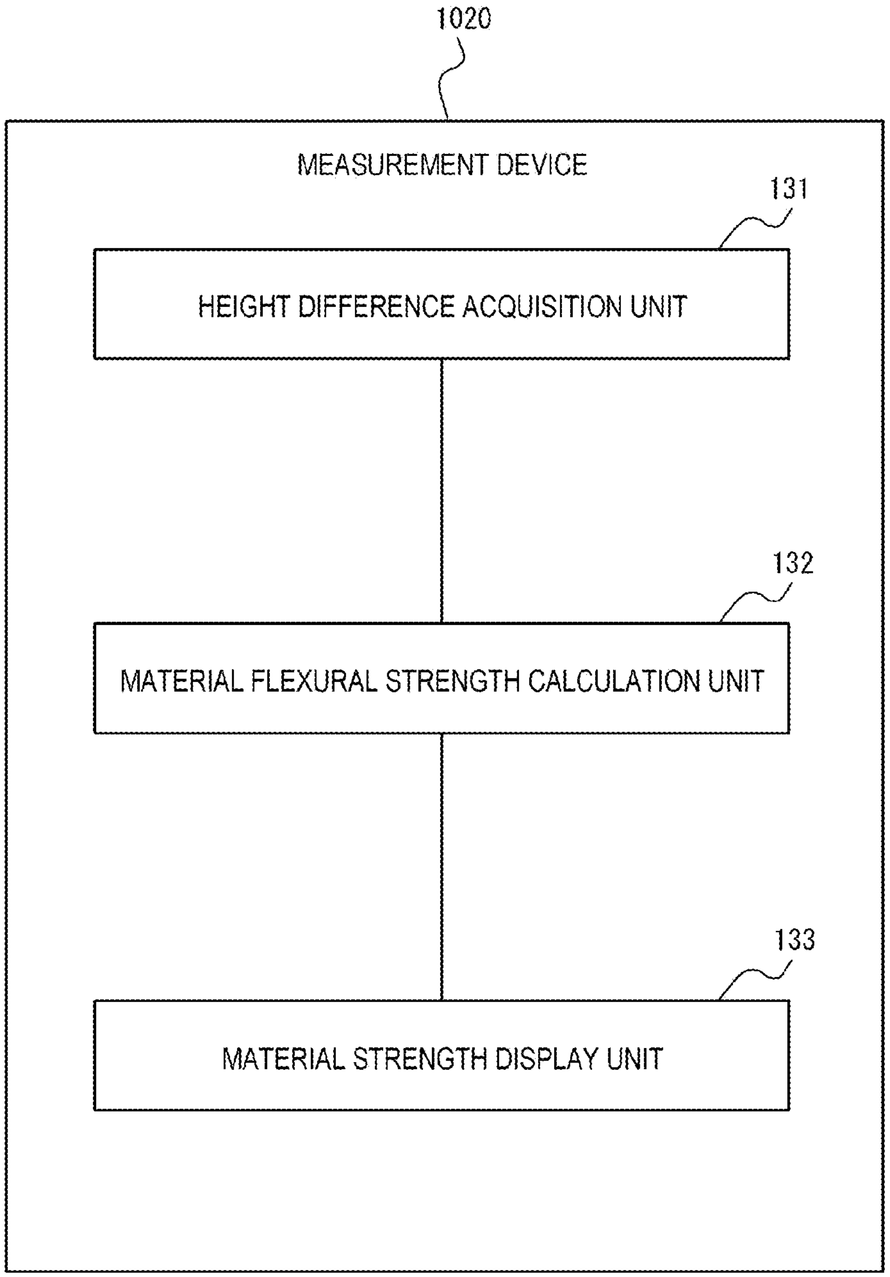
FIG. 13 is a block diagram illustrating a measurement device according to an embodiment.

FIG. 13 is a schematic block diagram illustrating the measurement device 1020 illustrated in FIG. 10. The measurement device 1020 includes a height difference acquisition unit 131 and a material flexural strength calculation unit 132. The measurement device 1020 can further include a material strength display unit 133. The material flexural strength calculation unit 132 is a control unit (controller), and may be configured with dedicated hardware such as an application specific integrated circuit (ASIC) or a field-programmable gate array (FPGA), may be configured with a processor, or may be configured to include the dedicated hardware and the processor.

The height difference acquisition unit 131 is an input interface that is connected to the measurement equipment 1010 illustrated in FIG. 10 and acquires a height difference measured by the measurement equipment 1010. In another embodiment, the height difference acquisition unit 131 may be configured such that an operator can input the acquired height difference.

The material flexural strength calculation unit 132 obtains material flexural strength of the structure from the vertical height difference acquired by the height difference acquisition unit 131. Specifically, for example, a relational expression between the vertical displacement and the flexural strength illustrated in FIG. 8 is obtained in advance and stored in the material flexural strength calculation unit 132. Then, based on this relational expression, the material flexural strength of the structure is obtained from the vertical displacement.

The material strength display unit 133 displays the material flexural strength of the structure obtained by the material flexural strength calculation unit 132 on a display or the like. The measurement device 1020 may further include a display that displays the material flexural strength of the structure obtained by the material flexural strength calculation unit 132.

In the above-described configuration, the relational expression between the vertical displacement and the flexural strength is stored in advance in the material flexural strength calculation unit 132. On the other hand, in the configuration illustrated in FIG. 14, the relational expression can be updated by an additional loading test or the like. In this configuration, the height difference acquisition unit 131 and the material strength display unit 133 are similar to the configurations illustrated in FIG. 13, and thus the description thereof will be omitted.

Figure 14:
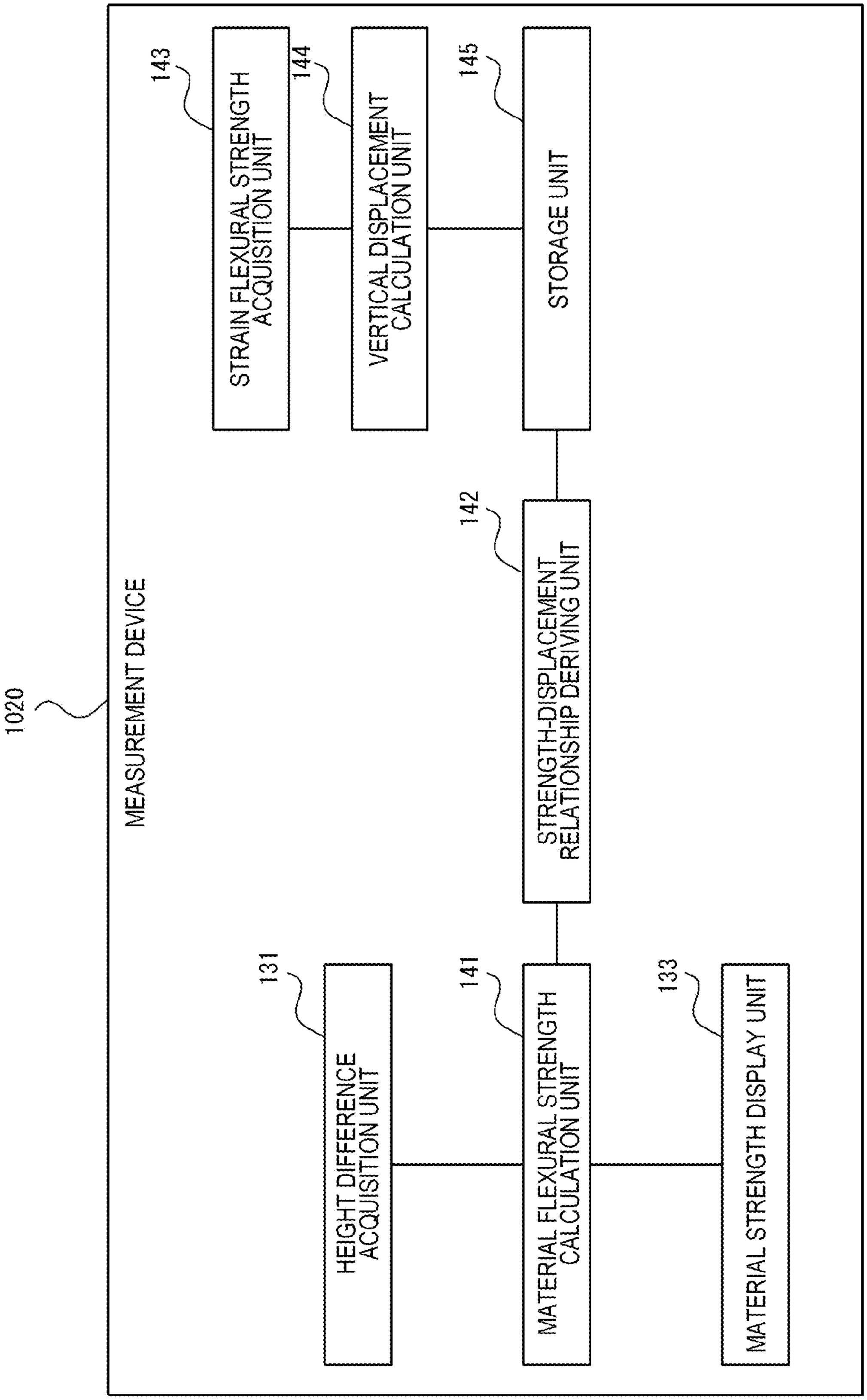
FIG. 14 is a block diagram illustrating a measurement device according to another embodiment.

The measurement device 1020 illustrated in FIG. 14 includes the height difference acquisition unit 131, a material flexural strength calculation unit 141, the material strength display unit 133, a strength-displacement relationship deriving unit 142, and a storage unit 145. The measurement device 1020 may further include a strain-flexural strength acquisition unit 143 and a vertical displacement calculation unit 144. The material flexural strength calculation unit 141 and the strength-displacement relationship deriving unit 142 configure a control unit (controller), and may be configured by dedicated hardware such as an application specific integrated circuit (ASIC) and a field-programmable gate array (FPGA), may be configured by a processor, or may be configured to include the dedicated hardware and the processor.

In the storage unit 145, for example, two sets (flexural strength MPa, vertical displacement: mm)=(6.5, 4.5) and (15.9, 2.9) of the vertical displacement and the flexural strength which are plotted in FIG. 8 are stored in advance. As described above, these sets can be obtained based on the result of the loading test or the result of the simulation by the finite element method or the like. The storage unit 145 includes one or more memories, and may include, for example, a semiconductor memory, a magnetic memory, an optical memory, or the like. Each memory included in the storage unit 145 may function as, for example, a main storage device, an auxiliary storage device, or a cache memory.

The strength-displacement relationship deriving unit 142 derives a function indicating a relationship between flexural strength and vertical displacement based on two or more sets of the vertical displacement and the flexural strength stored in the storage unit 145. For example, as described above, the strength-displacement relationship deriving unit 142 can derive the function (flexural strength)=−5.875×(vertical displacement)+32.938 based on (flexural strength MPa, vertical displacement: mm)=(6.5, 4.5) and (15.9, 2.9) which are two sets of the vertical displacement and the flexural strength. A derivation method will not be described again.

The material flexural strength calculation unit 141 calculates the flexural strength with respect to a height difference which is a difference in the vertical displacement by using the function derived by the strength-displacement relationship deriving unit 142.

The strain-flexural strength acquisition unit 143 can receive input of a flexural strength and a set of pressures caused by a loading load against strain. For example, the user can input flexural strength of 6.5 MPa in the test structure subjected to the loading test to the strain-flexural strength acquisition unit 143 and input a set of pressures due to the loading against the strain illustrated in FIG. 5.

The vertical displacement calculation unit 144 can obtain the vertical displacement from the horizontal strain and the direction in which the strain is measured. Since the calculation method has been described above, the description thereof will be omitted.

The strength-displacement relationship deriving unit 142, the strain-flexural strength acquisition unit 143, the vertical displacement calculation unit 144, or the storage unit 145 may be provided outside of the measurement device 1020. The measurement device 1020 illustrated in FIG. 14 can update the result of the loading test or the result of the simulation by the finite element method or the like more easily.

(Measurement Method)

Figure 15:
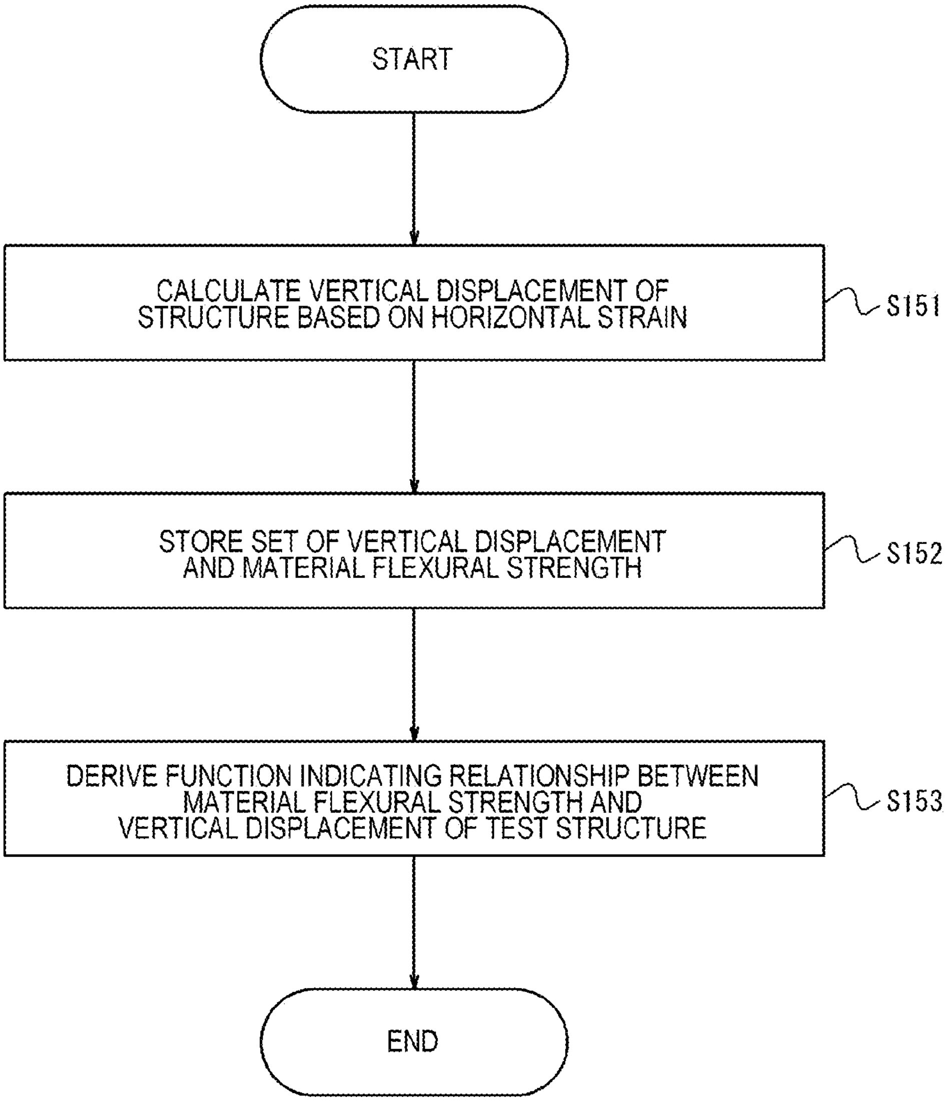
FIG. 15 is a flowchart illustrating an example of preprocessing executed by the measurement device.
Figure 16:
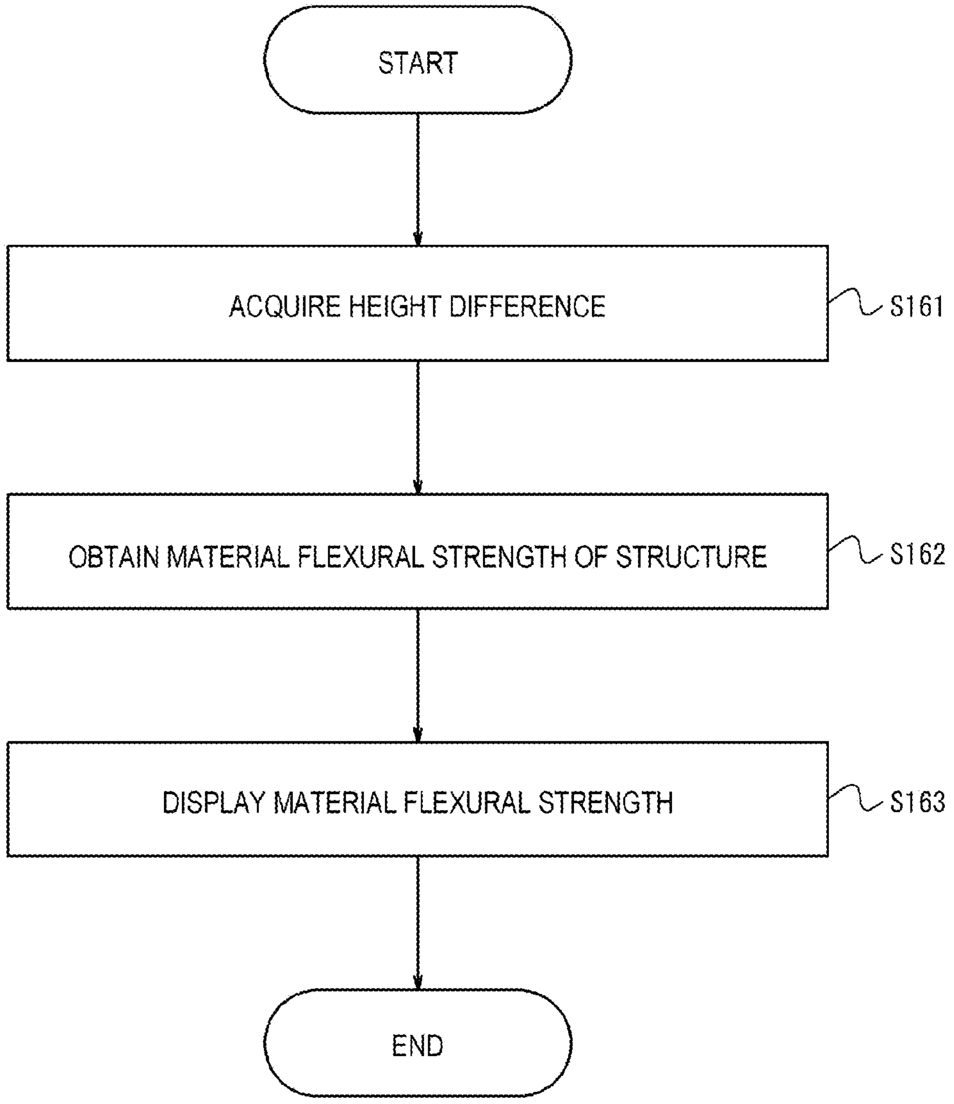
FIG. 16 is a flowchart illustrating an example of a process of estimating flexural strength of a material on a site using the measurement device.

Next, a measurement method according to an embodiment will be described. FIGS. 15 and 16 are flowcharts illustrating an example of processing executed by the measurement device 1020 illustrated in FIG. 14. The process illustrated in FIG. 15 is so-called preprocessing performed in a laboratory or the like before estimation of the flexural strength of the material on a site. The process shown in FIG. 16 is a process of estimating the flexural strength of the material on a site based on this preprocessing.

The preprocessing will be described below. As described above, the preprocessing is generally performed in the loading test performed in a laboratory or the like instead of on a site.

In step S151 of FIG. 15, the vertical displacement calculation unit 144 of the measurement device 1020 illustrated in FIG. 14 calculates the vertical displacement of the test structure (the test RECMH 10', see FIG. 2) that simulates the structure (the RECMH 10, see FIG. 1) for estimating the material strength on a site. This calculation is based on the strain and the flexural strength acquired by the strain-flexural strength acquisition unit 143. In the example described above, a test RECMH 10' that has a flexural strength of 6.5 MPa was prepared. When a pressure of 9.8 $N/m^2$ corresponding to the vertical soil pressure was loaded on the upper floor slab 11 of the test RECMH 10', as a result obtained by measuring the strain in the longitudinal direction at the center of the upper surface of the upper floor slab 11, the strain was $12\times10^{-6}$ as illustrated in FIG. 5. From these results, the strain-flexural strength acquisition unit 143 acquires the fact that the flexural strength of the test structure subjected to the loading test is 6.5 MPa and acquires the set of pressures caused by the loading load with respect to the strain illustrated in FIG. 5. Then, as described above, the vertical displacement calculation unit 144 calculates the vertical displacement of the test RECMH 10' from this set and calculates that the difference in the vertical displacement between the central portion and the end portion on the center line in the longitudinal direction of the lower floor slab 14 is 4.5 mm.

In step S152, the storage unit 145 of the measurement device 1020 stores a set of the vertical displacement calculated in step S151 and the material flexural strength of the RECMH 10'. In the above-described example, the storage unit 145 stores (flexural strength MPa, vertical displacement: mm)=(6.5, 4.5), (15.9, 2.9).

In step S153, the strength-displacement relationship deriving unit 142 of the measurement device 1020 derives a function indicating a relationship between the material flexural strength and the vertical displacement of the RECMH 10'. In the above-described example, a function (flexural strength)=5.875×(vertical displacement)+32.938 is derived. Here, the preprocessing ends.

Hereinafter, referring to FIG. 16, a process in which the user using the measurement device 1020 estimates the flexural strength of the structure on a site based on the preprocessing will be described. In step S161, the user acquires a height difference that is a difference between vertical displacements of the two points on the bottom surface of the structure. In the above-described example, for example, as illustrated in FIG. 12, the user performs grounding of the first vertical member 1012 of the measurement equipment 1010 to the center of the lower floor slab 14 of the RECMH 10, and performs grounding of the second vertical member 1013 to the end portion of the lower floor slab 14. At that time, a displacement sensor of the measurement device 1020 measures a height difference of, for example, 3.5 mm, and outputs a signal based on the measured result to the height difference acquisition unit 131 of the measurement device 1020. In another example described above, as illustrated in FIG. 9, the user measures the central portion height H' and the end portion height H of the retained water 90 using a ruler or the like. Thereafter, the user inputs the central portion height H' and the end portion height H to the height difference acquisition unit 131 of the measurement device 1020. The height difference acquisition unit 131 can calculate the height difference between the central portion and the end portion of the RECMH 10 by calculating the difference between the central portion height H' ‘and the end portion height H.

In step S162, the material flexural strength calculation unit 132 or 141 of the measurement device 1020 obtains the material flexural strength of the structure based on the height difference information. For example, when the height difference is 3.5 mm, the material flexural strength calculation unit 141 estimates that (flexural strength)=−5.875×3.5+32.938=12.376 Mpa.

In step S162, the material strength display unit 133 of the measurement device 1020 displays the material flexural strength of the structure obtained by the material flexural strength calculation unit 132 or 141 on a display or the like. The process ends here.

In the foregoing processing, the user can acquire the estimated result of the material strength of the structure only through simple length measurement. The user performs maintenance or the like of the structure as necessary according to the estimated material flexural strength.

In order to function as the above-described measurement device 1020, it is also possible to use a computer capable of executing a program instruction. Here, the computer may be a general-purpose computer, a dedicated computer, a workstation, a personal computer (PC), an electronic note pad, or the like. The program instruction may be a program code, a code segment, or the like for executing a necessary task.

The computer includes a processor, a storage unit, an input unit, an output unit, and a communication interface. The processor is a central processing unit (CPU), a micro processing unit (MPU), a graphics processing unit (GPU), a digital signal processor (DSP), a system on a chip (SoC), or the like and may be configured with the same type or different types of a plurality of processors. The processor reads and executes the program from the storage unit to perform control of each of the above-described configurations and various types of arithmetic processing. At least a part of these processing content may be implemented by hardware. The input unit is an input interface that receives a user input operation and acquires information based on a user operation and is a pointing device, a keyboard, a mouse, or the like. The output unit is an output interface that outputs information and is a display, a speaker, or the like. The communication interface is an interface for communication with an external device.

The program may be recorded on a computer-readable recording medium. When such a recording medium is used, the program can be installed in the computer. Here, the recording medium on which the program is recorded may be a non-transitory recording medium. The non-transitory recording medium is not particularly limited, but may be, for example, a CD-ROM, a DVD-ROM, a Universal Serial Bus (USB) memory, or the like. The program may be downloaded from an external device via a network.

The following supplements for the foregoing embodiments will be further disclosed.

(Supplement 1)

A measurement device including:

a control unit configured to acquire a height difference between two points on a bottom surface of a structure, and calculate a material flexural strength of the structure based on the height difference.

(Supplement 2)

The measurement device according to Supplement 1, further including:

a storage unit configured to store in advance a set of a vertical displacement of a test structure and material flexural strength of the test structure, the vertical displacement being calculated in advance based on a horizontal strain with respect to a loading load of the test structure simulating the structure, wherein the control unit derives a function indicating a relationship between the material flexural strength and the vertical displacement of the test structure based on two or more sets of the material flexural strength and the vertical displacement stored in the storage unit, and calculates the material flexural strength with respect to the height difference using the function.

(Supplement 3)

The measurement device according to Supplement 1 or 2, wherein the control unit calculates the material flexural strength based on an extension direction of a straight line connecting the two points.

(Supplement 4)

A measurement system including: the measurement device according to any one of Supplements 1 to 3; and measurement equipment, wherein the measurement equipment includes:

a horizontal member, a first vertical member that is fixed to the horizontal member to be able to move in a vertical direction with respect to the horizontal member and includes a protrusion amount presentation unit indicating a first protrusion amount in the vertical direction; and a second vertical member that is fixed at a position different from the first vertical member on the horizontal member to be able to move in a vertical direction with respect to the horizontal member, and includes a protrusion amount presentation unit indicating a second protrusion amount in the vertical direction, and wherein the measurement device acquires a height difference based on the first and second protrusion amounts.

(Supplement 5)

A measurement method including:

a height difference acquisition step of acquiring a height difference between two points on a bottom surface of a structure; and a material flexural strength acquisition step of obtaining a material flexural strength of the structure based on the height difference.

(Supplement 6)

The measurement method according to Supplement 5, further including:

a vertical orientation calculating step of calculating a vertical displacement of the structure based on a horizontal strain with respect to a loading load in a loading test of a test structure simulating the structure;

a storing step of storing a set of a vertical displacement calculated in the vertical orientation calculating step and a material flexural strength of the test structure; and a strength-displacement relationship deriving step of deriving a function indicating a relationship between the material flexural strength and the vertical displacement of the test structure based on two or more sets of the material flexural strength and the vertical displacement stored in the storing step, wherein, in the material flexural strength calculating step, the material flexural strength with respect to the height difference is calculated using the function.

(Supplement 7)

The measurement method according to Supplement 5 or 6, wherein the structure contains retained water, and wherein in the height difference acquisition step, a difference between water depths of the two points of the retained water is set as the height difference.

(Supplement 8)

A non-transitory storage medium storing a program which is able to be executed by a computer, the non-transitory storage medium storing a program causing the computer to function as the measurement device according to any one of Supplements 1 to 3.

The above-described embodiments have been described as representative examples and it is apparent to those skilled in the art that many modifications and substitutions can be made within the spirit and scope of the present disclosure. Accordingly, it should not be understood that the present invention is limited by the above-described embodiments, and various modifications or changes can be made without departing from the scope of the claims. For example, a plurality of configuration blocks described in the configuration diagrams of the embodiment can be integrated, or one configuration block can be divided.

REFERENCE SIGNS LIST

10 RECMH
10' Test RECMH
11 Upper floor slab
11*o* Opening portion
12 Short side wall
12*o* Opening portion
13 Long side wall
14 Lower floor slab
20 10 MN structure tester
21 Steel floor
22 Loading plate
30 Strain gauge
90 Retained water
131 Strength calculation unit
132 Height difference acquisition unit
133 Material strength display unit
141 Strength calculation unit
142 Strength-displacement relationship deriving unit
143 Strength acquisition unit
144 Vertical displacement calculation unit
145 Storage unit
1010 Measurement equipment
1011 Horizontal member
1012 First vertical member
1013 Second vertical member
1020 Measurement device

The invention claimed is:

1. A measurement device comprising a processor configured to execute operations comprising:

acquiring a height difference between two points on a bottom surface of a structure;

generating a function indicating a relationship between a material flexural strength and a vertical displacement of a test structure based on two or more sets of the material flexural strength and the vertical displacement; and calculating a material flexural strength of the structure based on the height difference according to the generated function.

2. The measurement device according to claim 1, further comprising:

storing in advance a set of a vertical displacement of a test structure and material flexural strength of the test structure, the vertical displacement being calculated in advance based on a horizontal strain with respect to a loading load of the test structure simulating the structure; and generating a function indicating a relationship between the material flexural strength and the vertical displacement of the test structure based on two or more sets of the material flexural strength and the stored vertical displacement, wherein the calculating further comprises calculating the material flexural strength with respect to the height difference using the function.

3. The measurement device according to claim 2, wherein the structure includes a first resin concrete utility hole made of resin concrete of which strength changes over time, and wherein the test structure includes a second resin concrete utility hole made of resin concrete of which strength changes over time.

4. The measurement device according to claim 2, wherein the loading load represents a soil pressure.

5. The measurement device according to claim 1, wherein the calculating further comprises calculating the material flexural strength based on an extension direction of a straight line connecting the two points.

6. The measurement device according to claim 1, wherein the material flexural strength of the material represents a strength of the material.

7. The measurement device according to claim 1, wherein the structure is an underground structure, and the structure is at least under soil pressure.

8. A measurement system comprising:

a measurement device comprising a processor configured to execute operations comprising:

calculating a material flexural strength of a structure based on a height difference between two points on a bottom surface of a structure; and measurement equipment, wherein the measurement equipment includes a horizontal member, a first vertical member that is fixed to the horizontal member to be able to move in a vertical direction with respect to the horizontal member and includes a protrusion amount presentation unit indicating a first protrusion amount in the vertical direction; and a second vertical member that is fixed at a position different from the first vertical member on the horizontal member to be able to move in a vertical direction with respect to the horizontal member, and includes a protrusion amount presentation unit indicating a second protrusion amount in the vertical direction, and wherein the measurement device acquires the height difference based on the first and second protrusion amounts.

9. The measurement system according to claim 8, wherein the processor is further configured to execute operations comprising:

storing in advance a set of a vertical displacement of a test structure and material flexural strength of the test structure, the vertical displacement being calculated in advance based on a horizontal strain with respect to a loading load of the test structure simulating the structure; and generating a function indicating a relationship between the material flexural strength and the vertical displacement of the test structure based on two or more sets of the material flexural strength and the stored vertical displacement, wherein the calculating further comprises calculating the material flexural strength with respect to the height difference using the function.

10. The measurement system according to claim 9, wherein the structure includes a first resin concrete utility hole made of resin concrete of which strength changes over time, and wherein the test structure includes a second resin concrete utility hole made of resin concrete of which strength changes over time.

11. The measurement system according to claim 9, wherein the loading load represents a soil pressure.

12. The measurement system according to claim 8, wherein the calculating further comprises calculating the material flexural strength based on an extension direction of a straight line connecting the two points.

13. The measurement system according to claim 8, wherein the material flexural strength of the material represents a strength of the material.

14. The measurement system according to claim 8, wherein the structure is an underground structure, and the structure is at least under soil pressure.

15. A measurement method comprising:

acquiring a height difference between two points on a bottom surface of a structure;

generating a function indicating a relationship between a material flexural strength and a vertical displacement of a test structure based on two or more sets of the material flexural strength and the vertical displacement; and obtaining a material flexural strength of the structure based on the height difference according to the generated function.

16. The measurement method according to claim 15, further comprising:

calculating a vertical displacement of the structure based on a horizontal strain with respect to a loading load in a loading test of a test structure simulating the structure;

storing a set of a vertical displacement calculated in the vertical orientation calculating step and a material flexural strength of the test structure; and generating a function indicating a relationship between the material flexural strength and the vertical displacement of the test structure based on two or more sets of the material flexural strength and the stored vertical displacement, wherein, in the obtaining the material flexural strength of the structure further comprises calculating the material flexural strength with respect to the height difference using the function.

17. The measurement method according to claim 16, wherein the loading load represents a soil pressure.

18. The measurement method according to claim 15, wherein the structure contains retained water, and wherein in the acquiring further comprises setting a difference between water depths of the two points of the retained water as the height difference.

19. The measurement method according to claim 15, wherein the structure includes a first resin concrete utility hole made of resin concrete of which strength changes over time.

20. The measurement method according to claim 15, wherein the material flexural strength of the material represents a strength of the material, and the structure is an underground structure, and the structure is at least under soil pressure.

* * * * *